Nov. 13, 1928.  
C. H. HUENEFELD ET AL  
1,691,809  
MACHINE FOR DIGGING PIT SILOS AND CISTERNS  
Filed Feb. 21, 1927  
4 Sheets-Sheet 1

WITNESSES  
H. T. Walker  
J. T. McAuliffe

INVENTOR  
C. H. Huenefeld and  
G. Campbell  
BY  
ATTORNEY

Nov. 13, 1928.
C. H. HUENEFELD ET AL
1,691,809
MACHINE FOR DIGGING PIT SILOS AND CISTERNS
Filed Feb. 21, 1927  4 Sheets-Sheet 2
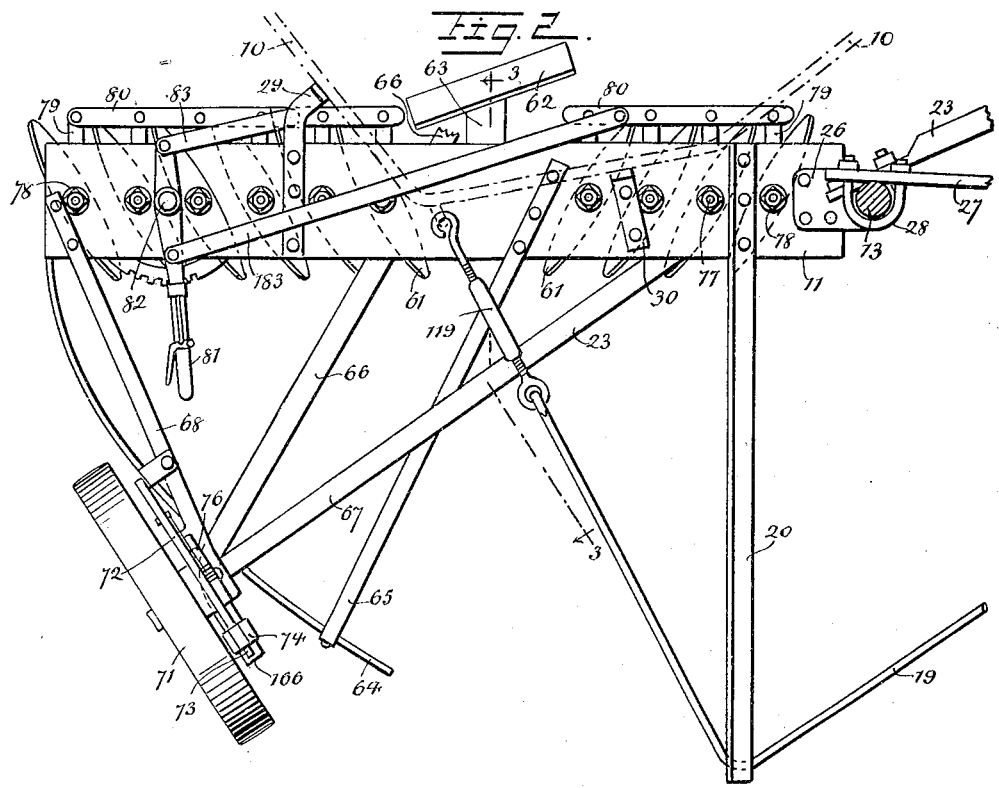
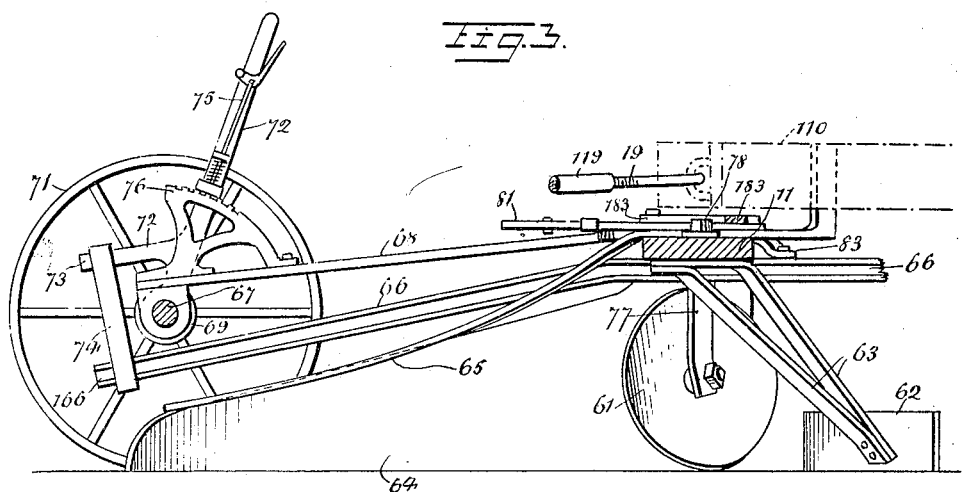
INVENTOR
C. H. Huenefeld and
G. Campbell
BY
ATTORNEY

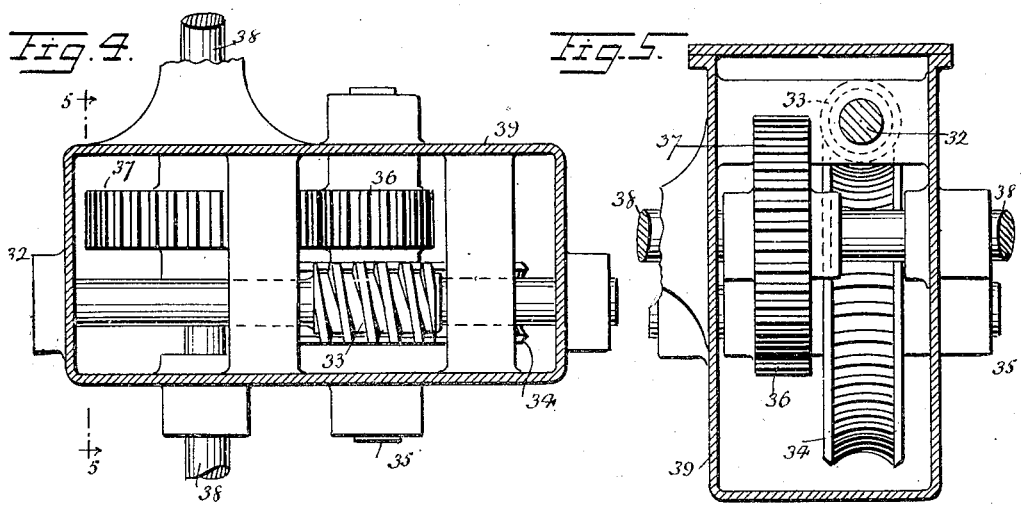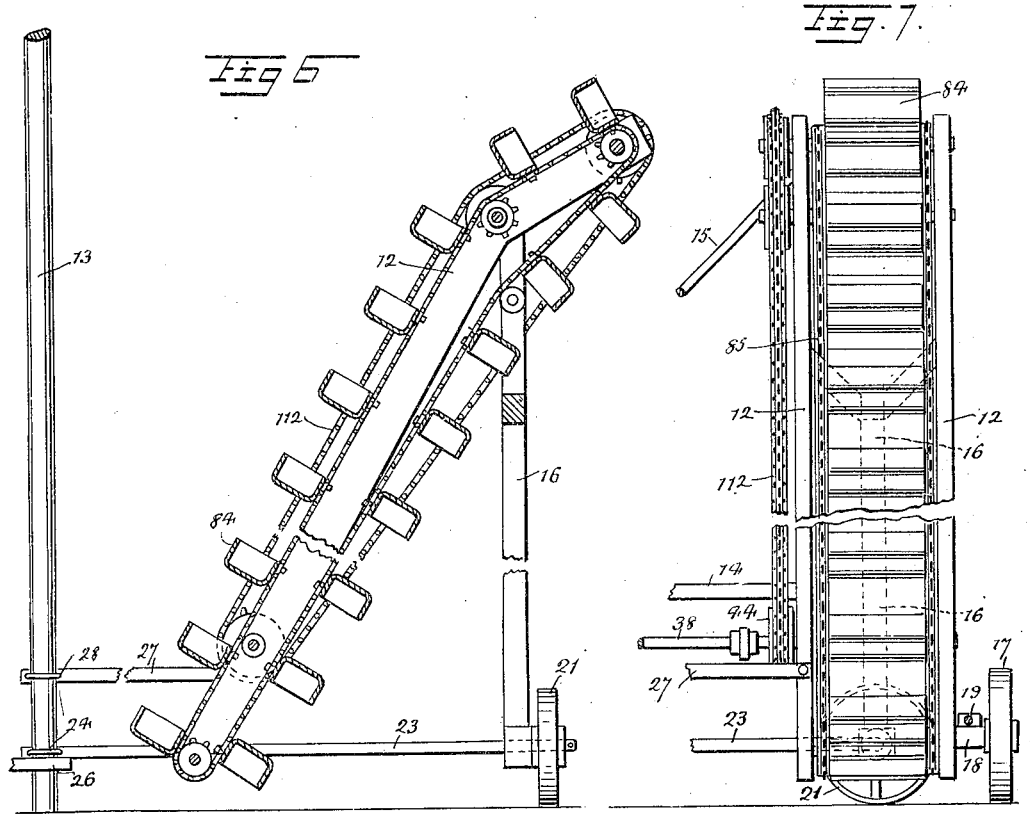

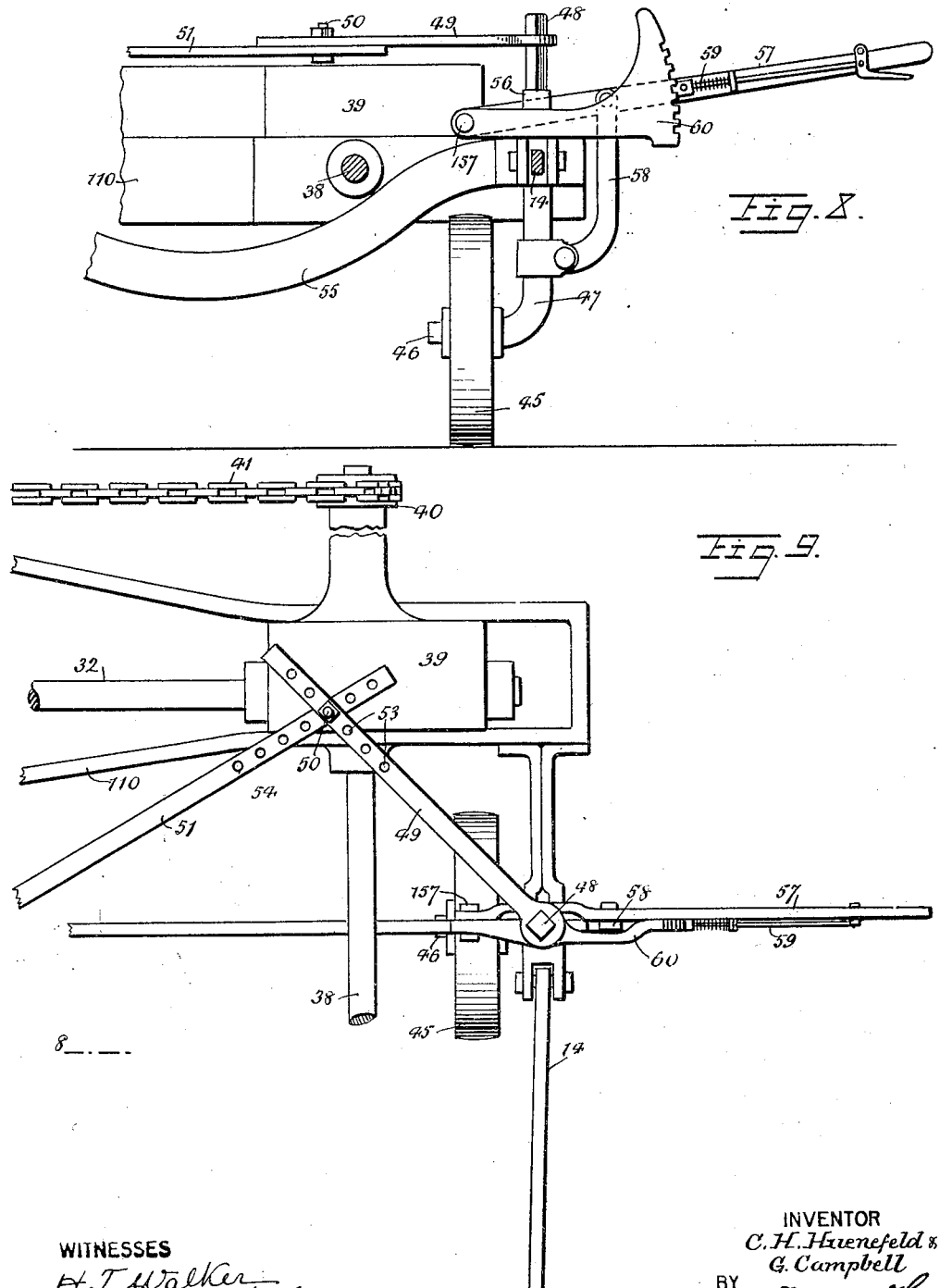

Patented Nov. 13, 1928.

1,691,809

UNITED STATES PATENT OFFICE.

CARL H. HUENEFELD AND GEORGE CAMPBELL, OF AURORA, NEBRASKA, ASSIGNORS OF TWO-THIRDS TO SAID HUENEFELD AND ONE-THIRD TO SAID CAMPBELL.

MACHINE FOR DIGGING PIT SILOS AND CISTERNS.

Application filed February 21, 1927. Serial No. 169,936.

Our invention relates to means for digging pit-silos, cisterns and the like.

It particularly relates to a machine for the indicated purpose, the elements of which machine are adapted to travel about a common axis and includes a tractor, a digging means and an elevator, the invention being distinguished by the presence of the tractor and serving to drive the parts in a circular path.

The invention is further distinguished by various characteristic features, including a series of digging disks and means to vary the weight placed on the disks to vary the digging action.

The invention further is characterized by a novel framework and bracing means connecting up the main frame and the motor frame with the digging means and the elevator so that these all travel in sequence through a circular path having a mast as an axis.

The nature of our invention and the distinctive features and advantages will clearly appear as the description proceeds.

Reference is to be had to the accompanying drawings forming a part of this specification, it being understood that the drawings are merely illustrative of one example of the invention.

Figure 2 is an enlarged plan view of the digging means and the devices appurtenant thereto;

Figure 3 is a transverse vertical section on the line 3—3 of Figure 2;

Figure 4 is a plan view of the drive gearing forming part of the illustrated form of the invention, the gear box being in horizontal section;

Figure 5 is a transverse vertical section on the line 5—5 of Figure 4;

Figure 6 is a vertical section through the elevator, embracing certain bracing elements, the mast being shown in part and in elevation;

Figure 7 is a front view of the elevator;

Figure 8 is a detail vertical section and showing in elevation the means for varying the angle of one of the running wheels pertaining to the machine and serving to support the machine at different points;

Figure 9 is a plan view of the devices shown in Figure 8.

Figure 1:
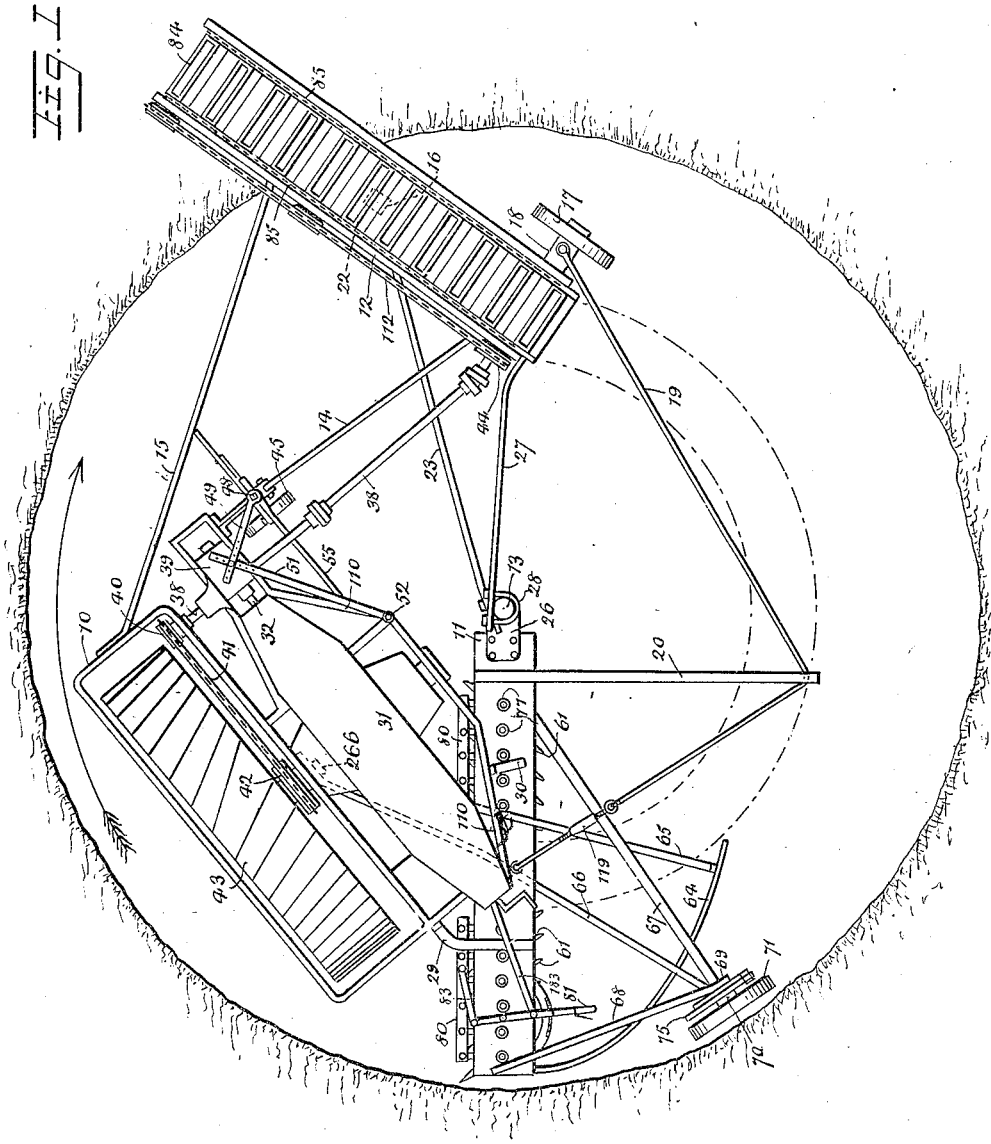
Figure 1 is a plan view of a digging machine embodying our invention, showing the same in association with the pit or similar cylindrical excavation.

In carrying out our invention in accordance with the illustrated example, a main frame 10 is provided having rigid therewith an auxiliary motor frame 110. The numerals 11 indicate the board carrying the digging means, 12 the elevator frame, 112 the elevator drive chain, 14 a brace between the elevator frame 12 and the auxiliary frame 110, and 15 a brace between the main frame 10 and the upper portion of the elevator frame. The elevator frame includes an upright post 16.

On the elevator frame 12 at the lower end is a running wheel 17, to the stub axle 18 of which is secured one end of a truss wire 19 bent over a strut 20 secured to the board or equivalent element 11 carrying the digging means. A running wheel 21 is provided also, beneath the elevator and to the bearing 22 of which at the post 16 is secured one end of a brace 23, the other end being shackled as at 24 to the mast 13.

The numeral 26 indicates a plate secured to the board 11 and through which plate the mast 13 extends. A brace 27 extends from near the bottom of the elevator frame 12 to the mast 13 to which it is secured by a shackle 28. A strap 29 connects the board 11 adjacent the juncture of the main frame 10 and the auxiliary frame 110. Frame 110 is secured to the board 11 by a bracket 30.

The numeral 31 indicates the motor conventionally shown, which motor may be of any approved type. The numeral 32 indicates the motor shaft on which shaft, in the illustrated form of the invention, is a worm 33 meshing with a worm wheel 34 on a shaft 35. On the shaft 35 is a pinion 36 meshing with a gear wheel 37 on the drive shaft 38. The numeral 39 indicates a gear box, housing the described gearing.

On the shaft 38 is shown a sprocket wheel 40 over which a sprocket chain 41 runs, said chain running also over a sprocket wheel 42 on the hub of a tractor wheel 43 whereby the machine is propelled in a circular path with the mast 13 as an axis. The shaft 38, in addition to driving the tractor wheel 43 as described, turns the drive sprocket 44 of the elevator chain 112. It is to be understood that the elevator and its drive may be of any approved arrangement.

There is a further ground wheel 45 provided, the axle 46 of which is formed on an upright post or spindle 47, to the square upper end 48 of which is secured one end of a strap 49 which is bolted near its opposite end to a second strap 51 secured as at 52 to the auxiliary frame 110. The straps 49 and 51 have each a series of holes 53 to receive the bolt or screw 50. By changing the point at which the straps 49 and 51 cross at the bolt 50 the spindle 47 is given a slight turn in one direction or the other so that the wheel 45 may travel in the desired circular path about the axis of the mast 13.

On a frame member 55, which may be connected to the frame 110 and to bar 14, is formed a bearing 56 in which the spindle 47 may turn or move vertically. A lever 57 is provided and has a depending link 58 shackled at its lower end to the spindle 47 so that said lever being fulcrumed, as at 157, on a rack 60, is engaged by the lever latch 59 and is rigid on the frame parts. Thus the lever 57 may be caused to raise or lower the running wheel 45.

The digging means consists of two series of obliquely disposed concave disks 61, both series serving to throw the dirt toward a medial plane between the two series of disks. The two series of disks 61 are spaced apart so that there is a non-dug zone formed between the disks and this undug zone is scraped by a scraper 62 rigid with shanks 63 secured to the board 11 at the under side.

A curved scraper 64 travels behind the digging disks 61 and the scraper 62, said scraper 64 being secured at one end to the outer end of the board 11 and braced near its opposite end by a brace 65 secured to the board 11. In order to regulate the weight imposed on the digging disks 61 to determine the amount dug and the depth of the digging I provide the following arrangement: The bar 66 is pivotally secured as at 266 to the frame 10 and extends beneath the board 11 so that said board rests directly on said bar 66. On an axle 67 is a ground wheel 71, said axle having support in a hanger bracket 69 on a brace bar 68 secured to the board 11. A lever 72 is fulcrumed on the axle 67 and has an arm 73 secured to the upper end of a stirrup-like yoke 74 through which the offset outer end 166 of bar 66 passes so that the rocking of lever 72 will raise or lower the bar 66 and thereby raise or lower the board 11 carrying the digger disks 61. The numeral 75 indicates the latch of lever 72 engageable with the rack 76 rigid with the brace bar 68.

Each digger disk 61 is revolubly mounted on a vertical shank 77, passing through board 11 and having a nut 78 permitting the turning of the shank about the vertical axis. To each shank 77 is secured a horizontal arm 79. The several arms 79 relating to a series of disks 61 are connected by a bar 80. A hand lever 81 is provided, fulcrumed to the bar 11 as at 82. The lever 81 is connected by a link 83 to one bar 80 and connected by a link 183 with the second bar 80 of the other series of disks. By rocking the lever 81 the links 83 and 183 will cause a movement of the bars 80 and 180 to vary the angular position of the disks 61.

The numeral 84 indicates an endless series of elevator buckets on chains 85. The numeral 119 indicates a turnbuckle that may be incorporated in the truss 19.

With the described construction, noting particularly Figure 1, it will be seen that the tractor wheel 43 and the board 11 carrying the digger disks 61 and the elevator 12 will track each other in a circular path with the mast 13 as an axis, the running wheels 17, 21, 45 and 71 running on the ground at the surface of the excavation. The digger disks 61 and the scraper or shovel 62 will loosen the dirt at the surface of the pit or other excavation, and the trailing arcuate scraper 64 will gather the dirt into a narrow heap, which with the traveling of the apparatus in a circular path will dispose the earth in an arcuate heap extending from the scraper 64 to the foot of the elevator 12, as indicated in dot and dash lines in Figure 1, so that the elevator will pick up and elevate the dirt.

We would state furthermore that while the illustrated example constitutes a practical embodiment of our invention, we do not limit ourselves strictly to the exact details herein illustrated since manifestly the same can be considerably varied without departure from the spirit of the invention.

What we claim is:

1. A digging machine of the class described including a frame mounted to turn about a vertical axis, a tractor wheel in the frame mounted to turn in a circular path about said axis, a digging means trailing said tractor wheel and an elevator trailing said digging means, and tractor wheel radially outward of the axis of rotation of said frame said digging means and elevator being mounted in the frame to turn about the same axis with the tractor wheel.

2. A digging machine of the class described including a frame mounted to turn about a vertical axis, a tractor wheel in the frame mounted to turn in a circular path about said axis, a digging means trailing the tractor wheel and an elevator trailing said digging means, said digging means and elevator being mounted in the frame to turn about the same axis with the tractor wheel; together with a scraper disposed behind the digging means and functioning to dispose the dirt in the path of travel of the elevator.

3. In a digging machine of the class described a tractor wheel, means mounting said tractor wheel to travel in a circular path about a vertical axis, digging means trailing the tractor wheel and an elevator trailing said digging means and tractor wheel radially outward of the axis of rotation of said tractor wheel.

4. In a digging machine of the class described a frame mounted to turn about a vertical axis, means to cause said frame to turn about said axis, a digging means, a ground wheel behind the digging means, a lever fulcrumed on the axle of said ground wheel, a bar connected with said frame on which said digging means is supported and adapted to be raised or lowered by said lever for varying the weight imposed on the digger means and thus varying the depth of the digging.

5. In a digging machine of the class described a frame, means to cause said frame to turn about a vertical axis, an element carried by said frame, two series of digger discs carried by said element at the under side, the disc being disposed in planes to throw the dirt toward a point medial between the series of discs and means positioned to dig the dirt along a line passing through a plane medial between said discs.

6. In a digging machine of the class described a frame, means to turn said frame about a vertical axis, an element in the frame and two series of obliquely disposed digger discs at the under side of said element and at opposite sides of the center thereof.

7. In a digging machine of the class described a frame, means to turn said frame about a vertical axis, an element in the frame and two series of obliquely disposed digger discs at the under side of said element and at opposite sides of the center thereof; together with a scraper positioned to dig the dirt along a zone intermediate between said discs.

8. In a digging machine of the class described a frame, means to turn said frame about a vertical axis, a ground wheel beneath said frame and affording a support for the same, a spindle mounting said ground wheel and adjusting means to turn said spindle about its axis for varying the angular position and path of travel of said ground wheel.

9. In a digging machine of the class described a frame, a mast approximately central of the frame, means to cause said frame to turn with said mast as an axis, digging means on the frame mounted to travel in said circular path and an elevator trailing the digging means; together with a brace extending from the elevator to said mast, the elevator and brace turning in said circular path.

10. In a digging machine of the class described a frame, a mast approximately central with the frame, means to cause said frame to turn with said mast as an axis, digging means on the frame mounted to travel in said circular path and an elevator trailing the digging means together with a brace extending from the elevator to said mast, the elevator and brace turning in said circular path; together with a ground wheel beneath the elevator, and a rod extending from the bearing of said ground wheel to the mast and turnable with the latter.

11. A digging machine of the class described including a frame mounted to turn about a vertical axis, a tractor wheel mounted in the frame to turn in a circular path about said vertical axis, supporting wheels additional to said tractor wheel, said tractor wheel and said supporting wheels being radially outward of said vertical axis, digging means trailing said tractor wheel, and an elevator trailing said digging means and said tractor wheel and disposed radially outward of said axis.

CARL H. HUENEFELD.
GEORGE CAMPBELL.